United States Patent
Zhang

(10) Patent No.: US 8,483,956 B2
(45) Date of Patent: Jul. 9, 2013

(54) PORTABLE ELECTRONIC DEVICE WITH GUIDE FUNCTION

(75) Inventor: Bin Zhang, Shenzhen (CN)

(73) Assignees: Shenzhen Futaihong Precision Industry Co., Ltd., Shenzhen (CN); Chi Mei Communication Systems, Inc., New Taipei (TW)

( * ) Notice: Subject to any disclaimer, the term of this patent is extended or adjusted under 35 U.S.C. 154(b) by 418 days.

(21) Appl. No.: 12/700,874

(22) Filed: Feb. 5, 2010

(65) Prior Publication Data

US 2010/0292923 A1    Nov. 18, 2010

(30) Foreign Application Priority Data

May 14, 2009   (CN) .......................... 2009 1 0302315

(51) Int. Cl.
*G01C 21/34* (2006.01)
*G01C 21/36* (2006.01)
*H04Q 5/22* (2006.01)

(52) U.S. Cl.
USPC ........... 701/428; 701/431; 701/433; 701/448; 701/541; 701/408; 700/245; 700/255; 700/253

(58) Field of Classification Search
USPC ................ 701/400, 408, 410, 419, 427, 428, 701/431, 433, 443, 488, 526, 533, 539, 541, 701/301; 700/245, 255, 253
See application file for complete search history.

(56) References Cited

U.S. PATENT DOCUMENTS

| | | | | |
|---|---|---|---|---|
| 3,337,839 A | * | 8/1967 | Nelkin | 367/105 |
| 3,546,467 A | * | 12/1970 | Benham et al. | 250/215 |
| 3,654,477 A | * | 4/1972 | Benjamin, Jr. | 250/552 |
| 4,712,003 A | * | 12/1987 | Ban et al. | 250/221 |
| 4,737,108 A | * | 4/1988 | Chepaitis | 434/113 |
| 5,118,180 A | * | 6/1992 | Wichmann et al. | 356/5.05 |
| 5,539,199 A | * | 7/1996 | Ruckh et al. | 250/222.1 |
| 5,687,136 A | * | 11/1997 | Borenstein | 367/116 |
| 5,717,392 A | * | 2/1998 | Eldridge | 340/996 |
| 5,807,111 A | * | 9/1998 | Schrader | 434/112 |
| 5,973,618 A | * | 10/1999 | Ellis | 340/990 |

(Continued)

FOREIGN PATENT DOCUMENTS

| | | |
|---|---|---|
| CN | 1645404 A | 7/2005 |
| CN | 1808473 A | 7/2006 |

(Continued)

OTHER PUBLICATIONS

Perrollaz et al., Long range obstacle detection using laser scanner and stereovision, 2006, Intelligent Vehicles Symposium.*

*Primary Examiner* — Thomas Black
*Assistant Examiner* — Sara Lewandroski
(74) *Attorney, Agent, or Firm* — Altis Law Group, Inc.

(57) ABSTRACT

An exemplary embodiment of portable electronic device with guide function includes a housing, a processing unit, a command unit, and a guiding unit. The processing unit and the guiding unit are positioned inside the housing, and the command unit is positioned at least partially outside of the housing. The processing unit is electrically connected to the command unit and the guiding unit. Operating the command unit, the portable electronic device with guide function is actuated into guiding mode controlled by the processing unit. The guiding unit sends detection signals to detect obstacles, receives feedback signals from the obstacles, the processing unit receives the feedback signal from the guiding unit to generate corresponding obstacle types and distance according to the feedback signal.

11 Claims, 5 Drawing Sheets

U.S. PATENT DOCUMENTS

| | | | | |
|---|---|---|---|---|
| 6,159,013 | A * | 12/2000 | Parienti | 434/114 |
| 6,198,395 | B1 * | 3/2001 | Sussman | 340/573.1 |
| 6,275,944 | B1 * | 8/2001 | Kao et al. | 726/36 |
| 6,278,944 | B1 * | 8/2001 | Lui et al. | 701/454 |
| 6,298,010 | B1 * | 10/2001 | Ritz et al. | 367/116 |
| 6,486,784 | B1 * | 11/2002 | Beckers | 340/573.1 |
| 6,489,608 | B1 * | 12/2002 | Skilling | 250/281 |
| 6,977,579 | B2 * | 12/2005 | Gilfix et al. | 340/407.1 |
| 7,039,522 | B2 * | 5/2006 | Landau | 701/539 |
| 7,310,903 | B2 * | 12/2007 | Kim | 42/90 |
| 7,801,645 | B2 * | 9/2010 | Taylor et al. | 700/258 |
| 7,992,310 | B2 * | 8/2011 | Litvin et al. | 33/286 |
| 8,094,012 | B1 * | 1/2012 | Tran et al. | 340/539.13 |
| 8,271,888 | B2 * | 9/2012 | Carter et al. | 715/757 |
| 2003/0014186 | A1 * | 1/2003 | Adams et al. | 701/207 |
| 2003/0226268 | A1 * | 12/2003 | Gibson | 33/281 |
| 2003/0229421 | A1 * | 12/2003 | Chmura et al. | 700/245 |
| 2005/0060088 | A1 * | 3/2005 | Helal et al. | 701/208 |
| 2005/0143868 | A1 * | 6/2005 | Whelan | 701/1 |
| 2005/0288079 | A1 * | 12/2005 | Tani | 463/1 |
| 2006/0184318 | A1 * | 8/2006 | Yoshimine | 701/209 |
| 2006/0229774 | A1 * | 10/2006 | Park et al. | 701/23 |
| 2007/0129849 | A1 * | 6/2007 | Zini et al. | 700/258 |
| 2007/0268178 | A1 * | 11/2007 | Jung et al. | 342/357.06 |
| 2007/0299612 | A1 * | 12/2007 | Kimura et al. | 701/301 |
| 2008/0172156 | A1 * | 7/2008 | Joh et al. | 701/45 |
| 2008/0275647 | A1 * | 11/2008 | Shin et al. | 701/301 |
| 2009/0028003 | A1 * | 1/2009 | Behm et al. | 367/116 |
| 2009/0235541 | A1 * | 9/2009 | Kumagai et al. | 33/281 |
| 2010/0070173 | A1 * | 3/2010 | Sakamoto | 701/209 |
| 2010/0076710 | A1 * | 3/2010 | Hukkeri et al. | 702/97 |
| 2010/0169009 | A1 * | 7/2010 | Breed et al. | 701/208 |
| 2010/0191418 | A1 * | 7/2010 | Mimeault et al. | 701/36 |
| 2010/0241350 | A1 * | 9/2010 | Cioffi et al. | 701/201 |
| 2010/0292917 | A1 * | 11/2010 | Emam et al. | 701/201 |
| 2011/0130940 | A1 * | 6/2011 | Smithers et al. | 701/99 |

FOREIGN PATENT DOCUMENTS

| | | |
|---|---|---|
| CN | 1847872 A | 10/2006 |
| CN | 1994245 A | 7/2007 |
| CN | 101153800 A | 4/2008 |
| CN | 101339041 A | 1/2009 |

* cited by examiner

PORTABLE ELECTRONIC DEVICE WITH GUIDE FUNCTION

BACKGROUND

1. Technical Field

The disclosure generally relates to portable electronic devices, particularly, to a portable electronic device having a guide function.

2. Description of the Related Art

Most portable electronic devices, such as mobile phones, personal digital assistants (PDAs), etc., are increasingly humanized, therefore making them more accessible for the visually impaired.

Portable electronic devices may be equipped with various satellite positioning systems, such as global positioning system (GPS), to provide the guide function. However, portable electronic devices equipped with GPS can only inform users of their position. GPS devices can not inform their users of the distances and types of obstacles in their path, and may have poor precision and accuracy. Moreover, when the users are in a closed in environment or place, the portable electronic devices with GPS may not work normally due to poor signal reception.

Therefore, there is room for improvement within the art.

BRIEF DESCRIPTION OF THE DRAWINGS

Many aspects of a portable electronic device with guide function can be better understood with reference to the following drawings. The components in the drawings are not necessarily drawn to scale, the emphasis instead being placed upon clearly illustrating the principles of the exemplary portable electronic device with guide function. Moreover, in the drawings, like reference numerals designate corresponding parts throughout the several views. Wherever possible, the same reference numbers are used throughout the drawings to refer to the same or like elements of an embodiment.

DETAILED DESCRIPTION

Figure 1:
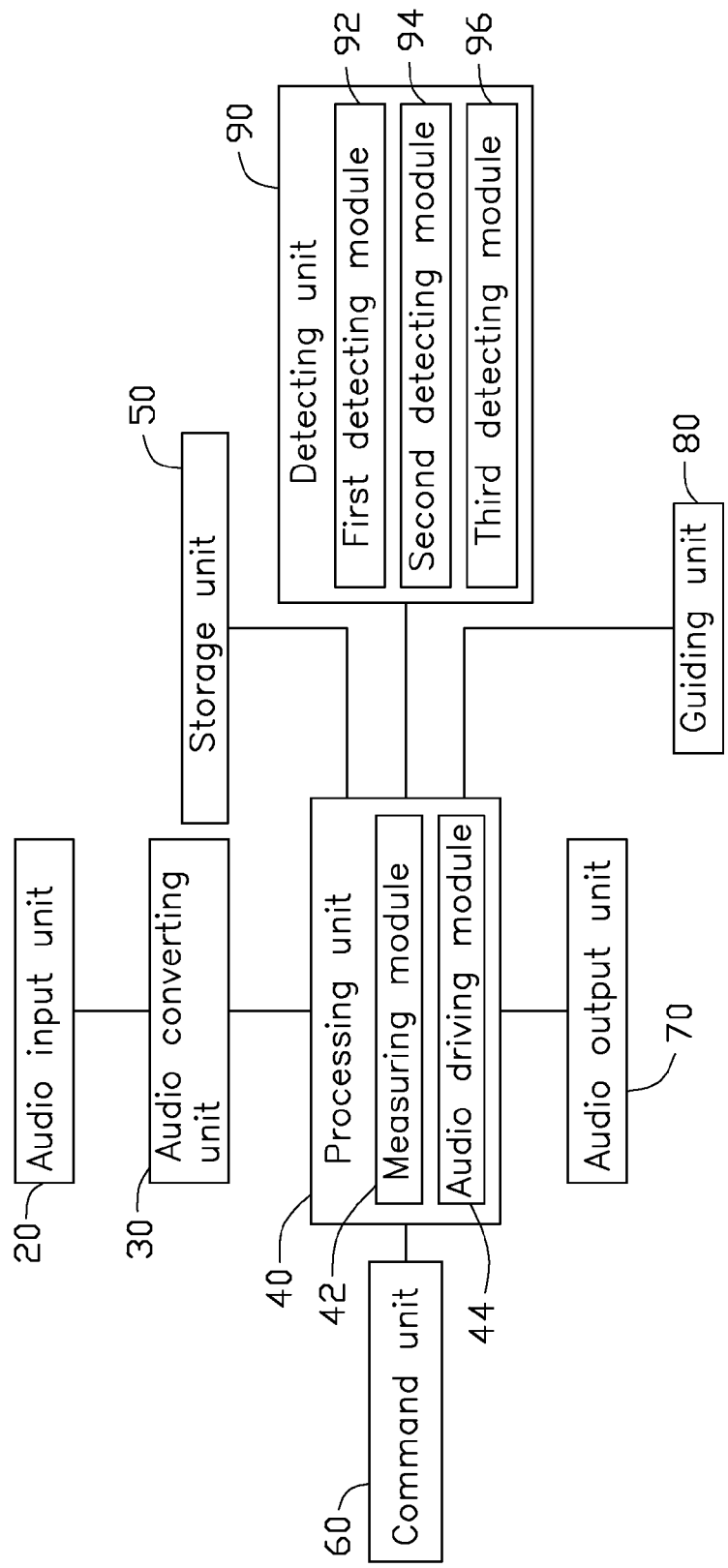
FIG. 1 is a block diagram of a portable electronic device with guide function, according to an exemplary embodiment.
Figure 2:
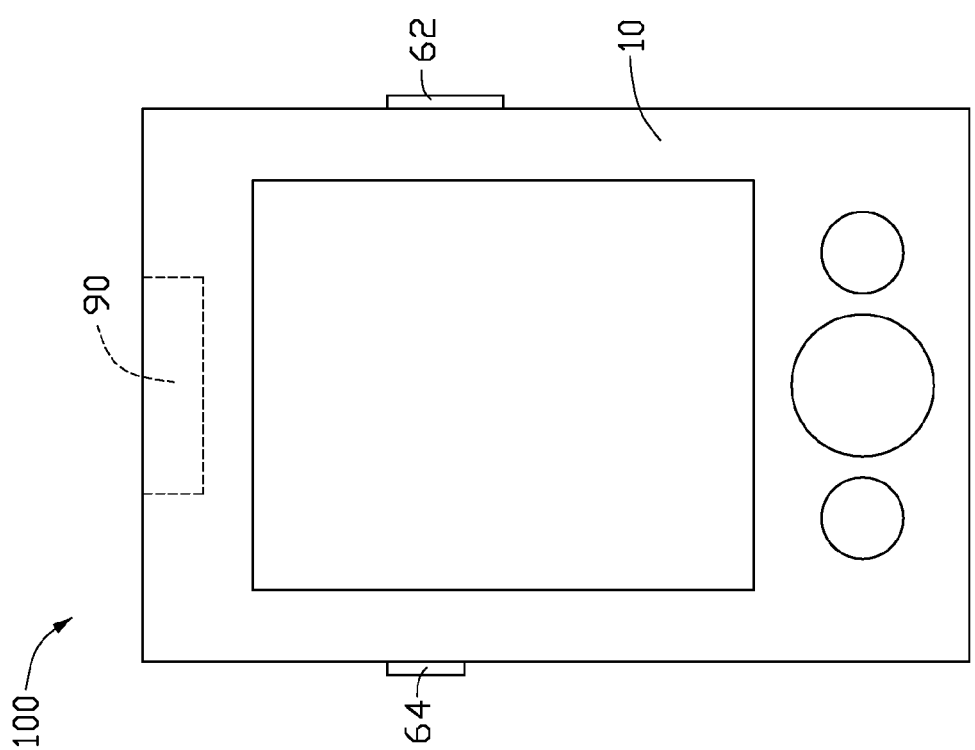
FIG. 2 is a schematic view of the portable electronic device with guide function, according to the exemplary embodiment.

FIGS. 1 and 2 show an exemplary embodiment of a portable electronic device such as a mobile phone, a PDA, etc with a guide function 100 that can be used for helping the visually impaired.

The portable electronic device with guide function 100 includes a housing 10, an audio input unit 20, an audio converting unit 30, a processing unit 40, a storage unit 50, a command unit 60, an audio output unit 70, a guiding unit 80, and a detecting unit 90. The audio input unit 20, the audio converting unit 30, the processing unit 40, the storage unit 50, the audio output unit 70, and the guiding unit 80 are positioned inside the housing 10. The command unit 60 is positioned at least partially outside the housing 10. The detecting unit 90 is also positioned at least partially inside the housing 10, and at least partially exposed from the housing 10.

The audio input unit 20 can be integrated with an existing audio input device, such as a microphone. The audio input unit 20 receives destination information from a user in the form of an audio signal. The audio converting unit 30 is electrically connected to the audio input unit 20. The audio converting unit 30 converts audio signals from the audio input unit 20 into corresponding digital code information, resulting from determining and mapping the travel route.

The processing unit 40 is electrically connected to the audio converting unit 30, the storage unit 50, the command unit 60, the audio output unit 70, the guiding unit 80, and the detecting unit 90. The processing unit 40 can be integrated with a baseband chip of the portable electronic device with guide function 100. The processing unit 40 includes a measuring module 42 and an audio driving module 44 electrically connected to the measuring module 42.

The measuring module 42 actuates the guiding unit 80 and controls the detecting unit 90 to send detection signals and receive reflected signals, and also determines the types of obstacles depending on characteristics of the reflected signals, and calculates the distance between the detecting unit 90 and the obstacles according to the time differences between the detection signals and the reflected signals. The audio driving module 44 stores various audio information and drives the audio output unit 70 to broadcast voice messages, such as obstacle types, obstacle distances, warning signals, etc.

The storage unit 50 stores a GPS navigation map including information of various locations, each location is mapped with corresponding digital codes. Thus, the storage unit 50 can automatically map the travel route by searching for corresponding digital codes in the GPS navigation map, and the location information in the GPS navigation map can be updated in real time.

The command unit 60 can be a typical operating device, such as a control panel, a keyboard, etc. The command unit 60 includes a guide button 62 and a warning button 64. The guide button 62 and the warning button 64 are located at least partially outside the housing 10 to facilitate identification and operation, such as on the sides of the portable electronic device. The guide button 62 has different size and shape than the other buttons to help facilitate its identification when operated.

When operated, the guide button 62 sends an electrical signal to the measuring module 42, placing the portable electronic device with guide function 100 into guiding mode. The warning button 64 also has different size and shape from the guide button 62 and the other buttons, so it can be conveniently used to make the audio output unit 70 output a warning sound to alert surrounding people.

The audio output unit 70 can be an existing speaker or earphone. The audio output unit 70 converts the audio information from the audio driving unit into corresponding voice messages and then broadcasts the voice messages. Moreover, the portable electronic device with guide function 100 can also output route information in other ways, such as different vibrations, or different audio frequencies.

The guiding unit 80 can be integrated with an existing radio frequency identification (RFID) chip. The guiding unit 80 may be used in combination with other guide aids specifically set up to assist the visually impaired to achieve a more accurate guide function. When operating the guide button 62, the guiding unit 80 sends radio frequency signals to the other guide aids, and receives feedback signals from the guide aids to determine the position of the user, and the audio driving module 44 drives the audio output unit 70 to inform the user of their specific position. Thus, the user can utilize the guiding unit 80 to be more accurately guided.

The detecting unit 90 is electrically connected to the processing unit 40 and can be a typical sensor, such as a microwave sensor, a laser sensor, or an ultrasonic sensor, etc. The detecting unit 90 sends a detection signal towards obstacles, receives reflected signals from the obstacles, and transmits the reflected signals to the measuring module 42. The detecting unit 90 can be used with a combination of sensors to offset transmission and absorption losses.

The detecting unit 90 includes a first detecting module 92, a second detecting module 94, and a third detecting module 96. The first detecting module 92, the second detecting module 94 and the third detecting module 96 are positioned at least partially on ends or sides of the housing 10. When the user is holding the portable electronic device with guide function 100, the detecting unit 90 is pointed in the direction of desired movement and the first detecting module 92 sends a detection signal parallel to the ground, to detect obstacles perpendicular to the ground, such as walls. The second detecting module 94 and the third detecting module 96 send detection signals parallel with each other and at an angle relative to the ground, and for assisting the first detecting module 92 in detecting protruding obstacles, such as bricks, steps, and recessed obstacles, such as water pits, sewers, etc.

In use, a user operates the guide button 62, which sends an electrical signal to the measuring module 42, causing the portable electronic device with guide function 100 to enter its guiding mode. The audio input unit 20 receives destination information from the user in the form of audio signals; the audio output unit 70 repeats the destination information to determine whether the destination is correct. The audio converting unit 30 converts the audio signal into corresponding digital code information, and the GPS navigation map in the storage unit 60 maps the travel route according to the digital code information. When the user is located within regions equipped to assist the visually impaired, the guiding unit 80 can achieve accurate guide by detecting the guide aids through RFID technology, and the audio output unit 70 broadcasts voice messages informing the users of their specific positions.

Figure 3:
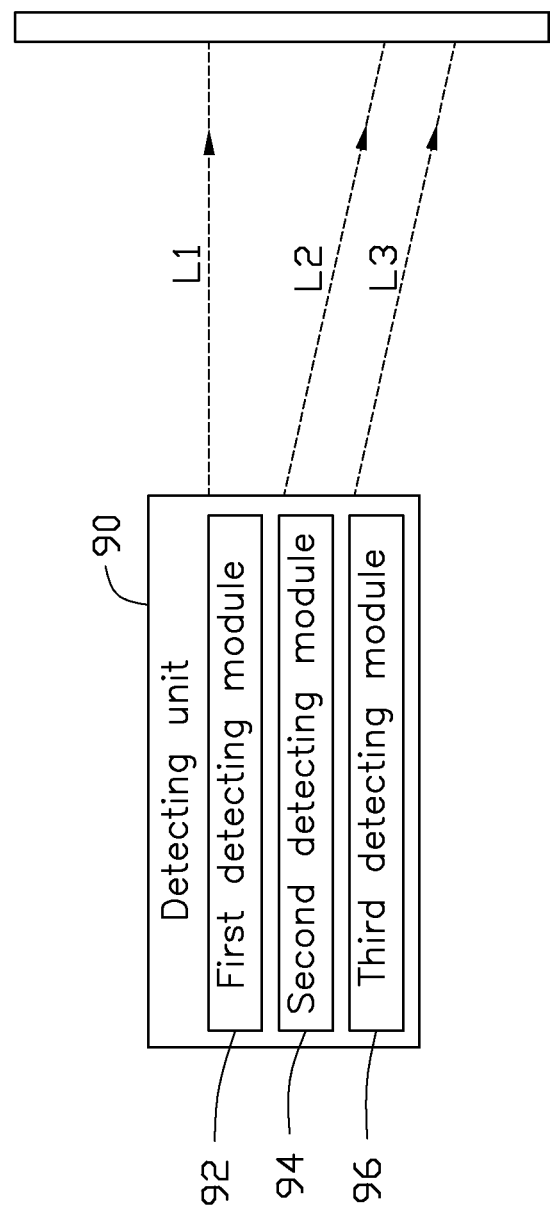
FIG. 3 is a schematic view of the light path of the detecting unit shown in FIG. 1 detecting a wall or pole like obstacle.

Further referring to FIG. 3, the first detecting module 92 sends a detection signal parallel to the ground and receives a corresponding reflected signal from obstacles in its path. The measuring module 42 calculates the distance between the first detecting module 92 and the obstacles according to time differences between the detection signals and the received reflected signals. The audio driving module 44 drives the audio output unit 70 to output the distance value or various warning sounds depending on corresponding distance.

For example, the rate of the detection signal is set as V, and the time difference between the detection signals and reflected signals is set as T1, then the distance between the first detecting module 90 and the obstacles is calculated as $L1=V*T1/2$. The safe distance is set by the user as La, and the warning distance is set by the user as Lb, if L1 is greater than or equal to the La, the user is at a safe distance. If the L1 is less than the Lb, which means the user is at a dangerous distance, then the audio output unit 70 broadcasts a corresponding warning signal to ensure the user moves away from the danger.

Figure 4:
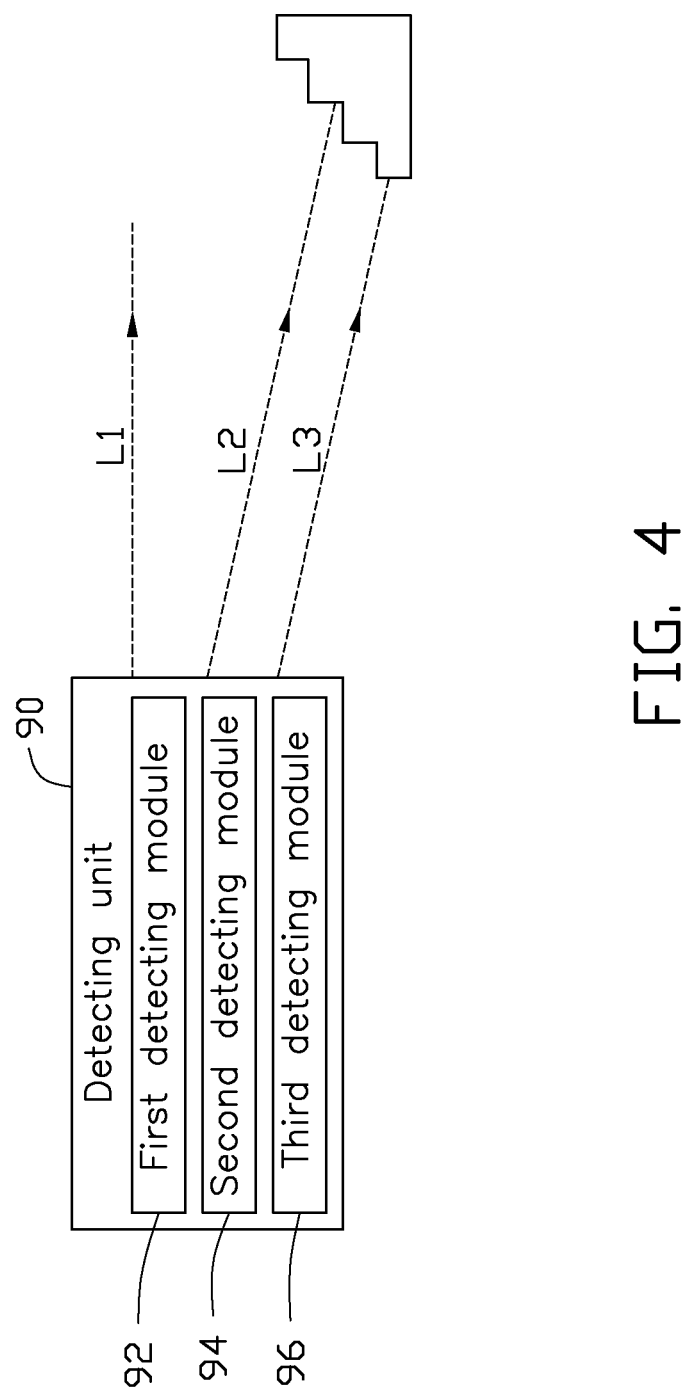
FIG. 4 is a schematic view of the light path of the detecting unit shown in FIG. 1 detecting a stair like obstacle.
Figure 5:
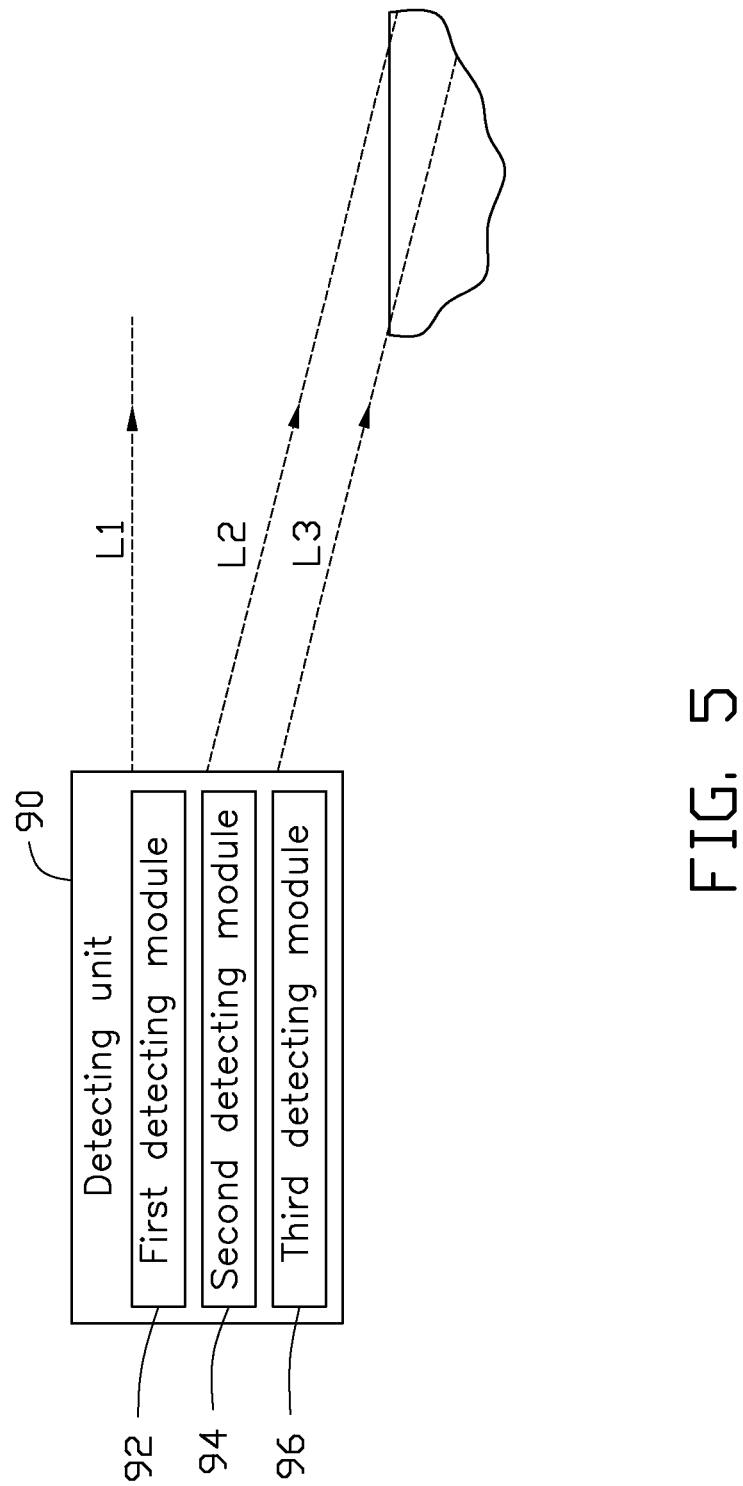
FIG. 5 is a schematic view of the light path of the detecting unit shown in FIG. 1 detecting recessed obstacles.

Further referring to FIGS. 4 and 5, the time differences of the second detecting module 94 and the third detecting module 96 are respectively set as T2 and T3, then the distance between the second detecting module 94 is calculated by the measuring module 42 as $L2=V*T2/2$, and the distance between the third detecting module 96 is calculated as $L3=V*T3/2$. The second detecting module 94 and the third detecting module 96 send parallel detection signals towards the obstacles, if $L2=L3>L1$, the obstacles in front path may be perpendicular to the ground, such as walls, cylinders, etc. If $L2>L3$ or $L2<L3$, the obstacles in front path may be bricks, steps, water pits, sewers, etc. Thus, the audio output unit 70 broadcasts corresponding predefined warning sounds associated with the different obstacle types mentioned above to warn the user of objects ahead.

To further expand the functions of the portable electronic device with guide function 100; the detecting unit 90 may further include a non-contact temperature sensor, which detects the temperature of the obstacles in front path to prompt users to avoid heat barriers, such as fire etc. Moreover, the transmission frequency of the detection signals can be set to different values as needed, and the warning sounds also can be set to different volumes and rhythms, depending on different distances and obstacles.

In the exemplary embodiment, the portable electronic device with guide function 100 has at least three detecting sensors, and the guiding unit 80 can determine the detailed position of the user. Thus, the portable electronic device with guide function 100 can not only achieve precise guide for the visually impaired, but can also send the obstacle information, such as whether there are obstacles, the distance of the obstacles, the types of the obstacles etc. Moreover, the portable electronic device with guide function 100 has a higher guide precision than the satellite positioning system, and can be used in a closed space or environment. It is convenient to use and can fully understand the obstacles in its path for the user.

It is to be understood, however, that even though numerous characteristics and advantages of the exemplary disclosure have been set forth in the foregoing description, together with details of the structure and function of the exemplary disclosure, the disclosure is illustrative only, and changes may be made in detail, especially in matters of shape, size, and arrangement of parts within the principles of exemplary disclosure to the full extent indicated by the broad general meaning of the terms in which the appended claims are expressed.

What is claimed is:

1. A portable electronic device with guide function, comprising:
   a housing;
   a processing unit positioned inside the housing, and for processing guiding information;
   a command unit positioned at least partially outside the housing and electrically connected to the processing unit, the command unit actuating the portable electronic device into a guiding mode controlled by the processing unit;
   a guiding unit positioned inside the housing and electrically connected to the processing unit, wherein the guiding unit is controlled by the processing unit to send radio frequency signals to detect external guide aids and receive feedback signals upon detection of the external guide aids, the processing unit receives the feedback signals from the guiding unit to determine a position of a user of the portable electronic device with guide function according to the feedback signals; and
   a detecting unit including at least three detecting modules, wherein at least one of the detecting modules sends a first detection signal transmitting along a first direction that is parallel to a ground, and at least two of the detecting modules send a second detection signal transmitting along a second direction that is oblique to the first direction and intersecting with the ground;

wherein the detecting modules are positioned at least partially outside the housing, receives reflected signals from obstacles, and sends the reflected signals to the processing unit to detect the obstacle types and distance, the processing unit includes a measuring module, the measuring module controls the detecting unit to send detection signals, determines the types of the obstacles according to the reflected signals, and calculates the distance between the detecting unit and the obstacles according to time differences between the detection signals and the reflected signals, the processing unit compares the distance between the obstacles and each of the detecting modules with each other to determine the types of the obstacles; and wherein when the distance between the obstacle and the detecting module sending the first detection signal is set as L1, the distance between the obstacle and one detecting module sending the second detection signal is set as L2, and the distance between the obstacle and the other detecting module sending the second detection signal is set as L3, if L2=L3>L1, the processing unit determines that the obstacle is perpendicular to the ground; if L2>L3 or L2<L3, the processing unit determines that the obstacle protrudes from the ground or recesses.

2. The portable electronic device with guide function as claimed in claim 1, wherein each detecting module is one of a temperature sensor, a microwave sensor, an ultrasonic sensor or a laser sensor.

3. The portable electronic device with guide function as claimed in claim 1, wherein the first detection signal transmits parallel to the ground and the detecting module sending the first detection signal receives the reflected signals from obstacles to determine the obstacle distance, and at the same time, the second detection signal transmits to intersect with the ground and the two detecting modules that sending the second detection signal receive the reflected signals from the obstacles and cooperate with the first detecting module to determine the obstacle types and distances.

4. The portable electronic device with guide function as claimed in claim 1, wherein the guiding unit includes a RFID chip, the RFID chip sends the audio frequency signals to various guide aids and receives the feedback signals from the guide aids to determine the position of the user of the portable electronic device with guide function.

5. The portable electronic device with guide function as claimed in claim 1, wherein the processing unit further includes an audio driving module electrically connected to the measuring module, the audio driving module storing various audio information.

6. The portable electronic device with guide function as claimed in claim 1, further including an audio input unit, the audio input unit receiving destination information from a user in the form of audio signal.

7. The portable electronic device with guide function as claimed in claim 5, further including an audio output unit electrically connected to the processing unit, the audio output unit converting the audio information into corresponding voice messages and outputting various voice message controlled by the audio driving module.

8. The portable electronic device with guide function as claimed in claim 7, further including a command unit electrically connected to the processing unit, wherein the command unit includes a guide button, the guide button is located at least partially outside the housing, and sends an electrical signal to the processing unit to actuate the portable electronic device with guide function into a guiding mode.

9. The portable electronic device with guide function as claimed in claim 8, wherein the command unit further includes a warning button, the warning button controlling the audio output unit to directly broadcast warning sounds.

10. The portable electronic device with guide function as claimed in claim 6, further including an audio converting unit electrically connected to the audio input unit and the processing unit, wherein the audio converting unit converts signal from the audio input unit into corresponding digital code information to determine and map travel route.

11. The portable electronic device with guide function as claimed in claim 10, further including a storage unit electrically connected to the processing unit, wherein the storage unit stores a navigation map, and maps the travel route by searching corresponding digital codes in the navigation map.

* * * * *